US008902316B2

(12) United States Patent
Minassian et al.

(10) Patent No.: US 8,902,316 B2
(45) Date of Patent: Dec. 2, 2014

(54) METHOD FOR CORRECTING IMAGES OUTPUT BY A DETECTOR WITHOUT TEMPERATURE REGULATION AND DETECTOR IMPLEMENTING SUCH A METHOD

(75) Inventors: Christophe Minassian, Voreppe (FR); Claire Pistre, Grenoble (FR); Jean-Marc Chiappa, Lans en Vercors (FR)

(73) Assignee: ULIS (FR)

( * ) Notice: Subject to any disclaimer, the term of this patent is extended or adjusted under 35 U.S.C. 154(b) by 462 days.

(21) Appl. No.: 13/446,935

(22) Filed: Apr. 13, 2012

(65) Prior Publication Data
US 2012/0200714 A1 Aug. 9, 2012

Related U.S. Application Data

(63) Continuation of application No. PCT/FR2010/052227, filed on Oct. 19, 2010.

(30) Foreign Application Priority Data

Oct. 22, 2009 (FR) ...................................... 09 57436

(51) Int. Cl.
| H04N 5/33 | (2006.01) |
| G01J 5/02 | (2006.01) |
| G01J 5/08 | (2006.01) |
| G01J 5/20 | (2006.01) |
| G01J 5/62 | (2006.01) |
| H04N 5/217 | (2011.01) |
| H04N 5/365 | (2011.01) |
| G01J 5/00 | (2006.01) |

(52) U.S. Cl.
CPC ... *H04N 5/33* (2013.01); *G01J 5/08* (2013.01); *G01J 5/0834* (2013.01); *G01J 5/20* (2013.01); *G01J 5/62* (2013.01); *H04N 5/2176* (2013.01); *H04N 5/3651* (2013.01); *G01J 2005/0077* (2013.01)
USPC .......................................................... 348/164

(58) Field of Classification Search
CPC ............ H04N 5/3651; H04N 5/33; G01J 5/62
See application file for complete search history.

(56) References Cited

U.S. PATENT DOCUMENTS

| 5,756,999 A | 5/1998 | Parrish et al. |
| 6,028,309 A | 2/2000 | Parrish et al. |

(Continued)

FOREIGN PATENT DOCUMENTS

| EP | 1953509 A1 | 8/2008 |
| WO | 0184118 A2 | 11/2001 |

(Continued)

OTHER PUBLICATIONS

International Search Report; Application No. PCT/FR2010/052227; Issued: Feb. 1, 2011; Mailing Date: Feb. 8, 2011; 3 pages.

*Primary Examiner* — Sath V Perungavoor
*Assistant Examiner* — Kate Luo
(74) *Attorney, Agent, or Firm* — St. Onge Steward Johnston & Reens LLC

(57) ABSTRACT

Image correction methods and systems are disclosed that correct raw values, including, subsequent to closing the shutter, acquiring a current raw value table, determining an offset correction table for the current temperature of the detector as a function of the current table and a set of stored raw value tables, and correcting the stream of raw values using the offset correction table. A maintenance process includes testing a condition for replacing a table of the current set with the current table, and if the condition is met, replacing the table of the current set with the current table. This test includes determining whether there is a new set of tables obtained by replacing a table from the current set with the current table that is more relevant than the current set with regard to subsequently determining an offset table.

14 Claims, 5 Drawing Sheets

(56) References Cited

U.S. PATENT DOCUMENTS

| | | |
|---|---|---|
| 6,433,333 B1 | 8/2002 | Howard |
| 6,630,674 B2 | 10/2003 | Knauth et al. |
| 6,690,013 B2 | 2/2004 | McManus |
| 2003/0160171 A1 | 8/2003 | Parrish et al. |
| 2005/0029543 A1 | 2/2005 | Govyadinov et al. |

FOREIGN PATENT DOCUMENTS

| | | |
|---|---|---|
| WO | 2006100663 A1 | 9/2006 |
| WO | 2007106018 A1 | 9/2007 |

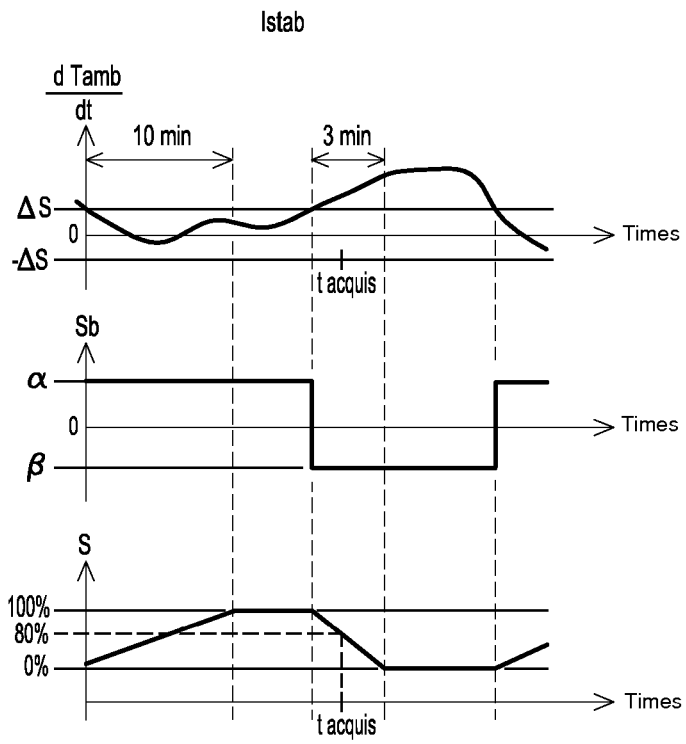
Fig. 5
Fig. 6
Fig. 7
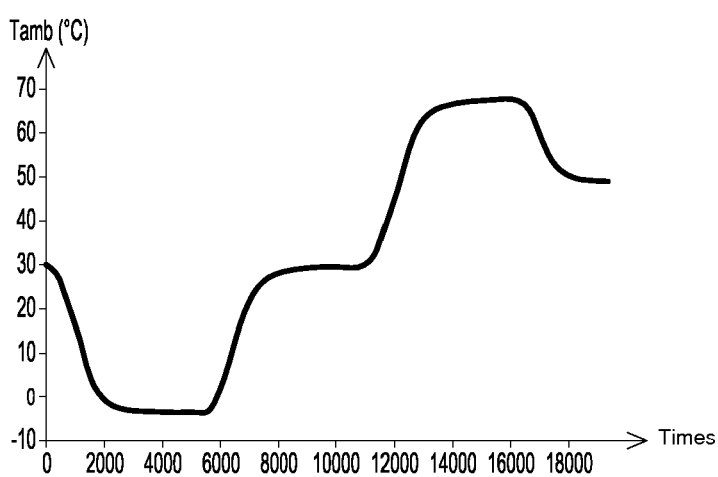
Fig. 8

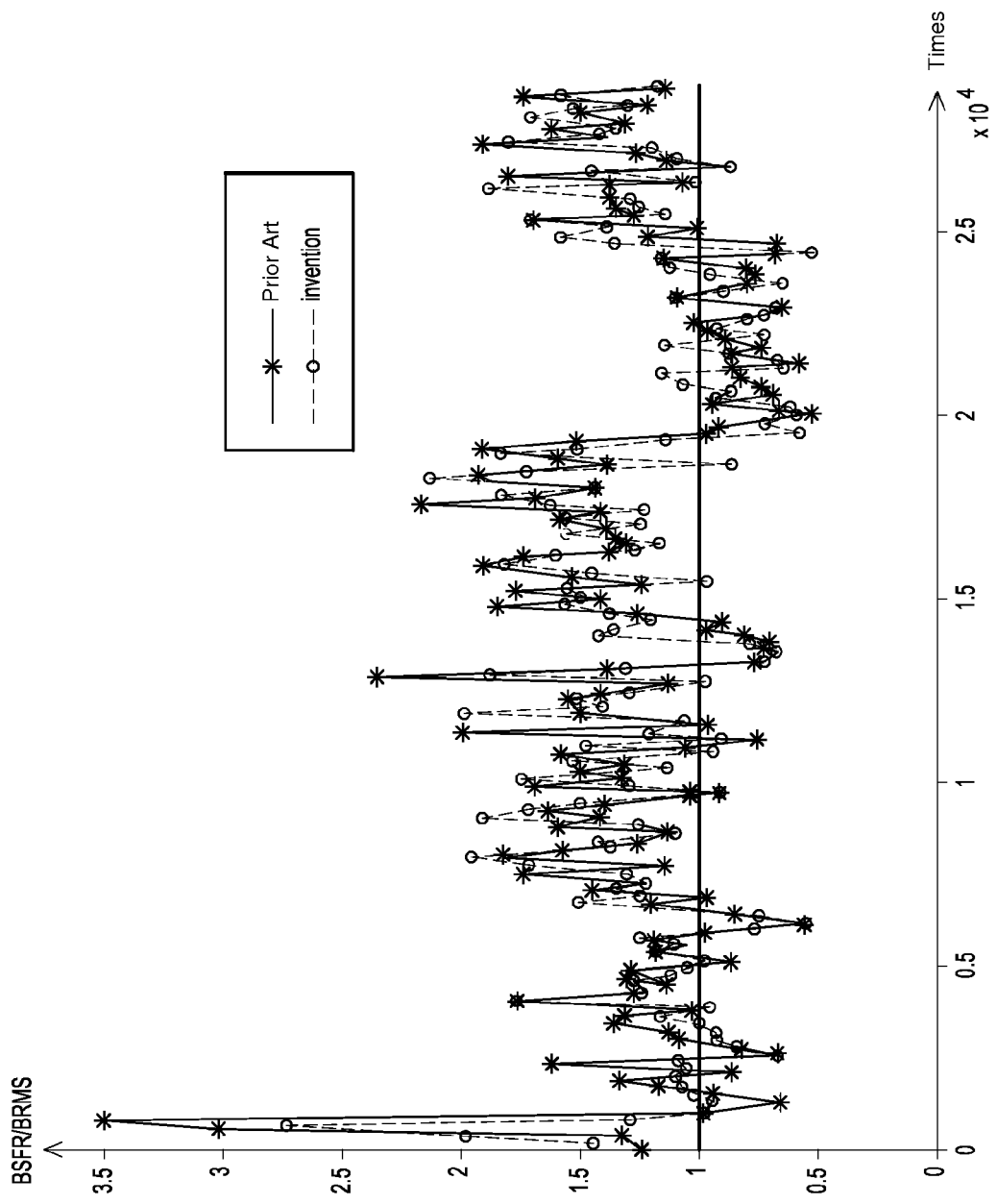

METHOD FOR CORRECTING IMAGES OUTPUT BY A DETECTOR WITHOUT TEMPERATURE REGULATION AND DETECTOR IMPLEMENTING SUCH A METHOD

CROSS-REFERENCE TO RELATED APPLICATIONS

The present application is a continuation of pending International Patent Application PCT/FR2010/052227 filed Oct. 19, 2010, which designates the United States and claims priority from French Patent Application FR 0957436, filed Oct. 22, 2009, the content of which is incorporated herein by reference.

FIELD OF THE INVENTION

The present invention relates to the field of infrared imaging and pyrometry using bolometers. More especially, the invention relates to the field of bolometric detectors, regardless of the detection band and the type of bolometric material used.

BACKGROUND OF THE INVENTION

Detectors designed for infrared imaging are conventionally produced as a one or two-dimensional array of elementary detectors, or bolometers, said bolometers taking the form of membranes suspended above a substrate, which is generally made of silicon, by means of support arms that have a high thermal resistance. This assembly of suspended membranes forms an array detection element that is usually referred to as a "retina".

The substrate usually incorporates means of sequentially addressing the elementary detectors and means of electrically exciting the elementary detectors and pre-processing the electrical signals generated by these bolometers. This substrate and the integrated means are commonly referred to as the "readout circuit".

In order to obtain a scene by means of this detector, the scene is projected through suitable optics onto the retina which is arranged in the focal plane of the optics and clocked electrical stimuli are applied via the readout circuit to each of the bolometers or to each row of such bolometers in order to obtain an electrical signal that constitutes an image of the temperature reached by each of said elementary detectors. This signal is then processed to a greater or lesser extent by the readout circuit and then, if applicable, by an electronic device outside the package in order to generate a thermal image of the observed scene.

This type of detector has numerous advantages in terms of its manufacturing cost and implementation but also has drawbacks that limit the performance of systems that use such detectors. In particular, there are problems with regard to the uniformity of the image obtained. In fact, when exposed to a uniform scene, not all the bolometers deliver exactly the same signal and this results in fixed spatial noise in the image thus obtained and this noise has a seriously adverse effect on the quality of the images produced. It is commonly referred to as "offset dispersion".

An image obtained from the array of bolometers is then corrected for offset dispersion by subtracting, from each pixel of said image, the offset that corresponds to that pixel which is stored in an "offset table" obtained during factory calibration by exposing the retina to a black body having a constant, known temperature. The corrected image of a uniform scene is then substantially uniform.

Nevertheless, determining an offset table is usually a tricky, time-consuming task. It actually involves presenting the detector with a scene having a known uniform temperature, classically a uniform-temperature black body, taking care to ensure a constant retina temperature that is substantially equal to that of the black body at the time of acquisition.

Also, the offset of a bolometer depends on its temperature so that if the temperature of the bolometer deviates from the temperature at which the offset table was determined, the latter becomes irrelevant and correction becomes unsatisfactory.

In order to overcome this problem in a first type of bolometric detector, the focal plane is temperature controlled, for example by means of a Peltier-effect module or a heater. The intention is to make sure that variations in the temperatures of bolometers are caused exclusively by radiation originating from the observed scene.

In a first version of a detector with a temperature-controlled focal plane, temperature regulation is performed based on a single predetermined temperature setpoint. This is referred to as a "single-temperature control mode". This version has the advantage of substantially limiting the operating temperature range of the detector either side of said setpoint, thus making it possible to use a single offset table. This limits the extent of factory calibration. On the other hand, the detector's energy consumption is far from optimal and this may even become a limiting factor in the context of stand-alone portable detectors. Indeed, when the detector's ambient temperature deviates substantially from the temperature setpoint, the energy used for temperature control purposes is considerable. Not only that, even if temperature control is implemented, it cannot ensure a perfectly constant temperature. The detector is constantly subjected to temperature disturbances originating from the environment of the retina, especially the package in which it is fitted; the temperatures of this package and its associated elements (optical unit, diaphragm, etc.) change freely as a function of radiation and other interference originating from its external environment. In fact, there are always transients that deviate from the temperature setpoint and these transients become greater the more the ambient temperature deviates from the setpoint.

Because single-temperature control mode is energy-consuming and becomes increasingly less accurate the more the ambient temperature deviates from the focal plane's single temperature setpoint, a second version of temperature-controlled detectors referred to as "multi-temperature controlled detectors" uses several temperature setpoints so that the difference between ambient temperature and the temperature of the retina is kept below a predetermined threshold. This minimises the energy consumed for temperature control purposes and the inaccuracy of the offset correction is contained regardless of temperature. However, this presupposes having an offset table for each temperature setpoint. The quantity of offset tables is usually large in order to reap maximum benefit from the advantages of the multi-temperature control mode and this involves very protracted factory calibration of these tables and therefore considerable manufacturing costs. In addition, in use it is found that transitional phases when there is a change from a first temperature setpoint to a second temperature setpoint generally cause a loss in the quality of the images produced by the detector.

Because temperature-controlled detectors consume large amounts of energy and are cumbersome and heavy, non-temperature controlled detectors, or "uncooled" detectors, commonly referred to as TEC-less (Thermo-Electric Cooler-less) detectors have been developed.

In a first version of a TEC-less detector, for example that described in documents EP 1 953 509 and U.S. Pat. No. 6,433,333, a plurality of offset tables are acquired in the factory for various temperatures of the focal plane over the presumed operating range of the detector and are then stored in the detector. Usually, in order to set the detector's ambient temperature, it is placed in a thermostatted enclosure that holds each one of a series of steady temperature levels for approximately one hour. In the final analysis, this calibration process takes several hours and requires a thermostatted enclosure and is therefore particularly expensive for the manufacturer.

During operation of the detector, the temperature at one point on the substrate is measured and an offset table is selected from the stored tables as a function of the measured temperature or an operational offset table for the measured temperature is obtained by interpolating the stored offset tables. The offset table thus produced, and consequently the correction table, are therefore temperature dependent. However, the effectiveness of such a correction depends on the relevance of the offset table that is used. In fact, it is necessary to provide a considerable number of tables for the temperature range in question and this is expensive.

Because the use of offset tables has proved to be uneconomical, other types of correction have been designed.

In a second version of the TEC-less detectors, for example that described in documents U.S. Pat. No. 5,756,999 and U.S. Pat. No. 6,028,309, the offset dispersion of bolometers is corrected by applying a variable bias to them. Indeed, the signal output by a bolometer depends directly on the current that flows through it. Modifying this current therefore modifies the bolometer's continuous output level and hence the value of its offset. However, this type of correction involves using custom-built bias circuitry for each bolometer and this makes designing the circuits of detectors much more complex and reduces fabrication yields. Not only that, detrimental deterioration of the signal-to-noise ratio is also observed. Also, this type of correction still requires offset tables although in limited quantities compared with the number of tables required by the first version.

In a third version of the TEC-less detectors, for example that described in document U.S. Pat. No. 6,690,013, offset dispersion is corrected as a function of the measured resistances of the bolometers based on an empirical model. However, simply measuring the electrical resistances of the pixels is not representative of all the causes of offset dispersion. Correction performed in this way is therefore only partially effective. In addition, the empirical model still uses parameter tables that require factory calibration similar to the calibration involved in producing offset tables.

Finally, in a fourth version of the TEC-less detectors, for example that described in document WO 2007/106018, offset dispersion correction is based on the actual scene itself and, more especially, on using the temporal evolution of information in the scene observed by the detector. This type of correction has the advantage of not requiring any prior factory calibration. On the other hand, corrections of this type are unsuitable for moving scenes because, by their very principle, such corrections eliminate or at least seriously degrade the detection of static elements or slow-moving elements in the scene. In addition, "gost" images that are not representative of the observed scene can appear under certain conditions.

Document US-A-2005/0029453 discloses a method for updating an offset table on the basis of two images from a shutter taken while the detector is operating. This method involves testing a condition for updating an offset table, for instance a condition that relates to the temperature variation observed since the offset table was last computed or a condition that relates to the age of the offset table, and acquiring a new image from the shutter if the condition is met. Once the new image has been acquired, a new offset table is then computed as a function of this new image and the image acquired at the time of the last update.

It should be noted that corrections based on previously calibrated offset tables are the most effective because the values contained in said tables are directly linked to measured offsets of bolometers. In addition, such corrections do not involve any limits on operation of the detector. Alternative corrections that try and limit or even eliminate offset tables make it possible to design TEC-less detectors less expensively but have a detrimental impact on correction quality or impose limitations on use of the detector.

SUMMARY OF THE INVENTION

The object of the present invention is to propose a simple, effective method for correcting the offset variation of a TEC-less detector which does not involve any prior factory calibration.

To achieve this, the object of the invention is a method for correcting images produced by an array of bolometers of a detector without temperature regulation, said array comprising a retina of bolometric membranes arranged in the focal plane of an optics and suspended above a substrate in which there is formed a readout circuit capable of outputting a stream of raw signal values that correspond to each bolometer in the array in relation to an observed scene, wherein the detector also comprises a shutter arranged between the optics and the retina and the method involving, in an operating mode in which the ambient temperature conditions of the detector are free to change:

a first step of closing the shutter and acquiring and storing in a memory of the detector:
  a current table of raw values corresponding to an image of the shutter by the array of bolometers; and
  a temperature of the detector during acquisition of said current raw value table, a second step of determining and storing, in the memory of the detector, an offset correction table for the current temperature of the detector as a function of:
  the current raw value table and the temperature associated thereof; and
  a current set of raw value tables corresponding to images of the shutter by the array of bolometers previously stored in the detector's memory and temperatures of the detector associated respectively with each of these tables at the time they were acquired, said temperatures being stored in the detector's memory; and a third step of correcting the stream of raw values by means of the offset correction table.

According to the invention, the method involves, subsequent to the acquisition of a current raw value table, a maintenance process of the current set of raw value tables comprising:

testing a condition for replacing a table of said current set with the current raw value table; and if said condition is met, replacing the table of said current set of tables with the current raw value table and replacing the acquisition temperature of the replaced table with the acquisition temperature of the current raw value table.

This test involves determining, on the basis of at least one predetermined criterion, whether there is a new set of tables obtained by replacing a table of the current set with the current table that is more relevant than the current set with regard to subsequent determination of the offset table.

The term "raw value" is taken here to mean the signal obtained from a bolometer without any offset correction having been applied to it. The term "maintenance" is taken to mean the process of taking a decision to activate the first step and modify or not modify the set of raw values and the process of then applying these modifications depending on the decision taken. This decision-making process is based on the values of a certain number of the detector's state parameters that are acquired and stored at the same time as the raw value tables and attached to these tables. This decision-making process consists of a series of conditional operations intended to decide whether or not it is appropriate to "update" the set. "Updating" is defined as incrementing the number N of elements of the set and/or modifying, in terms of raw value and/or parameter, at least one element of the set other than the element that was acquired last.

In other words, the invention retains the concept of an offset correction value obtained empirically by measurement. However, these values are ultimately obtained while the detector is actually operating rather than during factory calibration, it being assumed that the shutter behaves in the same way as the uniform-temperature black body that is used when calibrating offset tables in accordance with the prior art.

Whereas, according to the prior art, offset tables are calibrated in accordance with very strict acquisition conditions in order to obtain optimal accuracy for the values that are to be used to correct offset dispersion, the invention uses less restrictive conditions thanks to the shutter which is at ambient temperature, without the need for any temperature control. Thus, in order to obtain raw values that are used to compute the offset correction value, there is no need to regulate the temperature of the focal plane. Moreover, it is not necessary for the temperature of the focal plane to be substantially equal to the temperature of the scene.

Ultimately, although, at first sight, correction appears to be of lower quality than correction based on offset tables that are accurately factory calibrated, correction of offset dispersion in accordance with the invention is actually of good quality. As it will be demonstrated below in relation to FIGS. 8 and 9, correction in accordance with the invention is actually of a quality that is substantially identical to correction obtained on the basis of accurately factory-calibrated tables. The invention therefore flies in the face of the usual assumption made in this field and what is explicitly or implicitly understood in documents according to the prior art, namely that it is imperative to have tables calibrated under well controlled laboratory conditions in order to obtain accurate correction.

In fact, thanks to the invention it is not necessary to provide factory calibration and this substantially reduces the cost of manufacturing the detector and the values used for correction purposes can be obtained while the detector is operating.

The invention benefits cumulatively from three advantages. The detector operates in a TEC-less mode which means that energy consumption is reduced to a minimum, factory calibration is minimised and the image quality obtained is highly satisfactory.

Note that the method according to the invention differs from the method described in document US-A-2005/0029453 in terms of the way in which the current table is used to update the set of stored tables.

First, the method according to the invention and the method in document US-A-2005/0029453 both use the current table to compute the offset table. In fact, at the instant in question, the current table is deemed to comprise relevant information.

However, according to the invention and in contrast to the method in document US-A-2005/0029453, there is an additional process of updating the set of raw value tables which is distinct from the process of updating the offset table and comprises its own criteria.

Indeed, according to the invention, a test is performed to ascertain whether replacing a table of the set of stored tables with the current table is likely to produce an additional gain in the quality with which the offset table will subsequently be computed. This additional gain is defined in relation to one or more objective criterion/criteria that is/are based solely on the tables that are likely to form the set of tables. Advantageously, but not limitatively, the ideal is, for instance, to obtain a set of tables that are recent, regularly spaced in terms of their acquisition temperature and were acquired while the temperature was stable.

In document US-A-2005/0029453, an old table is systematically replaced with the current table. If the temperature or age condition is met, replacement takes place. There is no evaluation to ascertain whether such replacement is disadvantageous or not. For example, it is possible that the current table was acquired under unstable thermal conditions and that the table acquired during the previous update was also acquired under unstable thermal conditions. The offset table computed on the basis of these two tables is then of very poor quality. If the detector is operating in an environment that changes temperature, for example when moving from a hot location to a cold location, the detector will produce an image of very poor quality for quite a while.

In contrast, according to the invention, the current table will not systematically replace one of the tables of the set of tables, it will only do so if there is a table that is considered to be even "worse".

Finally, in order to fully understand the method according to the invention and fully understand the method according to the prior art, it should be noted that management of the "poor quality" of the current table which is systematically used when computing the offset table is realised through the frequency at which the current table itself is updated, this table always being the most accurate in the short term. For example, if there is a significant temperature variation, the temperature condition is observed more frequently and, consequently, the offset table is updated more frequently, but a current table that is deemed to be less relevant than all the other tables (it is deemed to be of "poor quality" on the basis of predefined criteria) does not leave any stored footprint in the most relevant set that is used at the time of subsequent corrections.

In one embodiment of the invention, the current set of stored tables is partially or totally built as a function of current tables acquired while the detector is operating. Thus no factory calibration is performed for the detector.

Alternatively, a set of raw default values is determined once-only on one or more reference detector(s) and is initially stored in the detector according to the invention. These default values are then replaced (updated) gradually as the detector operates. Correction is then more accurate at the start of the process due to the relatively relevant default values that were initially stored. Note that no prior calibration is used.

In one embodiment of the invention, the at least one criterion comprises a criterion relating to the relevance of these tables vis-a-vis the detector's current operating state, especially a criterion relating to the age of their acquisition and/or a criterion relating to the detector's temperature stability at the time said raw value tables were acquired.

In other words, a raw value table that is used as a basis for computing the offset correction table may no longer be precisely valid after a while, for example due to drift in the bolometer's characteristics. It is therefore advantageous to replace the oldest raw value tables recurrently, for example periodically and/or depending on the result of a regularly repeated age test. Similarly, some conditions under which a raw value table is acquired are unfavourable, for example raw value tables acquired when the detector's temperature is fluctuating rapidly. It is therefore advantageous to replace (update) raw value tables acquired previously under such conditions if there are any. Recent raw value tables acquired under better conditions and therefore an offset correction table of optimum quality are thus obtained after the detector has been used for a certain length of time.

In one particular embodiment of the invention, the at least one criterion comprises a criterion relating to the relevance of these tables vis-a-vis computing the offset correction table. In particular, said relevance criterion comprises a criterion relating to the distribution of the temperatures at which the tables were acquired with updating the set of raw value tables being intended to ensure optimal distribution of these temperatures within the temperature range over which the detector operates.

In other words, the quality of the offset correction table also depends on the manner in which it was computed regardless of the measured quantities used at the time it was computed. For example, if all the stored tables correspond to temperatures grouped around a given temperature, computing an offset correction table for a very different temperature by interpolating the tables that are grouped together will produce a value of relatively little relevance. Building and recurrently updating the set of raw values according to the invention thus allows optimal distribution of the temperatures of the raw value tables used to compute the offset correction table, by interpolation for example. In particular, steps are taken to ensure that said acquisition temperatures of the raw value tables are regularly staggered, for instance every 15° C., over a detector operating range that typically extends from −20° C. to +70° C.

In one embodiment of the invention, the method also comprises evaluating a first condition for updating the offset correction table which, if said first condition is met, triggers:
 closure of the shutter, acquisition of a current raw value table and the maintenance process of the current set of stored tables; and
 computation of a new offset correction table as a function of the current raw value table and the set of stored raw value tables.

In particular, the first condition for updating the offset correction value comprises a criterion relating to the age of the current raw value table, said first condition being met, in particular, if the age of the current table exceeds a predetermined duration. Also, and in particular, the first condition for updating the offset correction table comprises a criterion relating to the difference between the detector's current temperature (at the precise instant in question) and the temperature of the detector associated with the current raw value, said first condition being met, in particular, if said difference exceeds a first predetermined threshold.

Preferably, the method also comprises evaluating a second condition for updating the offset correction table and if said second updating condition is met this triggers computing a new offset correction table as a function of the current raw value table and the set of stored raw value tables without triggering the maintenance process. In particular, the second condition for updating the offset correction value comprises a criterion relating to the difference between the detector's current temperature and the temperature of the detector associated with the last time the offset correction table was computed, said second condition being met, in particular, if said difference exceeds a second predetermined threshold that is lower than the first threshold.

In other words, the operating state of the detector may have changed since the last time the offset correction values were computed. It is therefore desirable to update the offset correction values. Nevertheless, under certain conditions, the last acquired current raw values may remain valid, especially if the detector's present temperature remains very close to the temperature at which the current raw values were acquired, e.g. if the detector's temperature has not changed by more than a few tenths of a degree.

In other words, the offset correction value is only recalculated if it is considered useful to do so in accordance with particular conditions. This avoids the additional noise associated with deliberate, very frequent recalculation in order to obtain tighter sampling of any changes in ambience and also reduces the system's power consumption. An offset correction value is thus deemed to be valid in the vicinity either side of the temperature for which it was computed and/or for a predetermined duration. It can be seen that the invention makes it possible to directly use the most relevant data to compute the offset correction value, especially data relating to the detector's current temperature.

In one particular embodiment of the invention, the offset correction table involves computing a raw value table by interpolating the current raw value table and a predetermined number of tables of the set of stored raw value tables and computing the offset correction value is performed in accordance with the equation:

$$O_n = \overline{S_{interp}(Tamb)} - G_n \times S_{int\ erp}(Tamb)_n$$

where $O_n$ is a value in the offset correction table, $\overline{S_{interp}(Tamb)}$ is the mean value of the interpolated raw value table, $G_n$ is a predetermined correction factor to correct the gain of the bolometer corresponding to said value $O_n$, and $S_{int\ erp}(Tamb)_n$ is the raw value that corresponds to said value $O_n$ of the interpolated table.

An object of the invention is also a thermal detector without temperature regulation comprising:
 an array of bolometers comprising a retina of bolometric membranes suspended above a substrate in which there is formed a readout circuit capable of outputting a stream of raw signal values that correspond to each bolometer in the array in relation to an observed scene and arranged in the focal plane of an optics;
 at least one temperature sensor capable of measuring the temperature at one point on the substrate;
 a controllable shutter capable of forming a uniform scene for the retina;
 information processing means comprising:
  storage means capable of storing a current raw value table and a current set of raw value tables corresponding to images of the shutter by the array of bolometers and temperature measurements output by the temperature sensor at the instants at which said tables are acquired;
  means of computing an offset correction table as a function of the detector's current temperature, the current raw value table and the set of previously stored raw value tables; and
  means of correcting the stream of raw values by means of the offset correction table.

According to the invention, the information processing means also comprise means of applying maintenance of the current set of stored raw value tables and the offset correction table, said maintenance means being capable of:

activating the closure of the shutter followed by acquiring and storing of a new current raw value table corresponding to the shutter and the temperature measurement obtained from the sensor at the instant at which the new current table is acquired; and testing a condition for replacing a table of said current set with the current raw value table; and if said condition is met, replacing the table of said current set of tables with the current raw value table and replacing the acquisition temperature of the replaced table with the acquisition temperature of the current raw value table.

This test involves determining, on the basis of at least one predetermined criterion, whether there is a new set of tables obtained by replacing a table of the current set with the current table that is more relevant than the current set with regard to subsequent determination of the offset table.

In other words, the detector is capable of using a method of the above-mentioned type.

BRIEF DESCRIPTION OF THE DRAWINGS

The invention will be more readily understood by the following description which is given merely by way of example and relates to the accompanying drawings in which:

FIGS. 5 to 7 illustrate steps in computing a temperature stability criterion in accordance with the invention; and FIGS. 8 and 9 respectively illustrate a temperature profile imposed on bolometers and the residual fixed spatial noise to temporal noise ratio obtained by implementing the invention with said temperature profile.

DETAILED DESCRIPTION OF THE INVENTION

The following description describes one preferred embodiment of the invention which is considered optimal in terms of optimising the frequency at which the shutter is closed (and hence image loss) and correction accuracy.

It must nevertheless be appreciated that there are two separate updating conditions even if they appear to overlap in time in the embodiment that is described below: one relates to updating the offset table and one relates to updating a set of raw value tables.

Obviously, it is possible to perform execution of both these updates in parallel and independently.

Figure 1:
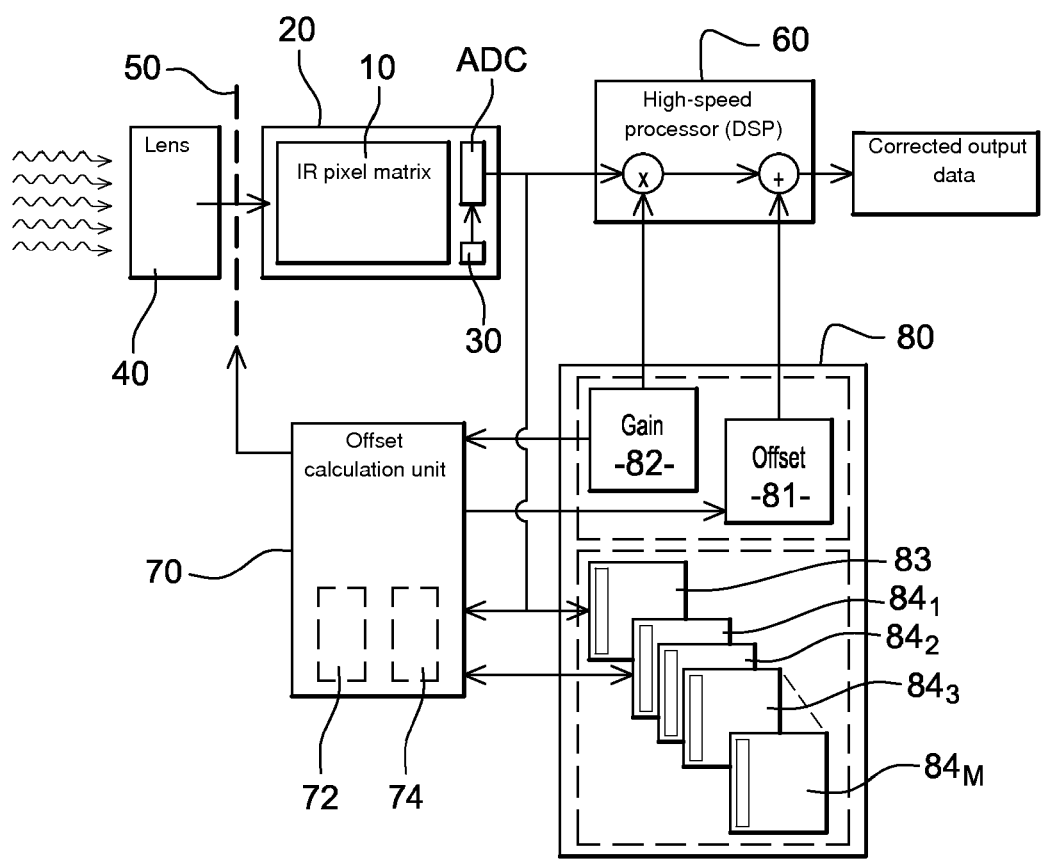
FIG. 1 is a schematic view of a detector in accordance with the invention.

FIG. 1 schematically shows a bolometric detector according to the invention. This detector is not temperature controlled and detects radiation from a scene that is to be observed in the infrared region.

The detector comprises an array 10 of elementary thermal detectors, or bolometers, which each comprise a bolometric membrane suspended above a substrate by support, bias and thermal insulating arms.

A readout circuit 20 and a temperature sensor 30 are also formed in the substrate and the suspended membranes of the bolometers collectively form a retina array arranged in the focal plane of an optics 40. A controllable shutter 50 is also provided on the optical path between optics 40 and the array 10 of bolometers. Readout circuit 20 provides a digital video stream that is representative of the thermal image of the observed scene formed by optics 40 and temperature sensor 30 outputs a digitised signal that is representative of the measured temperature and that is associated with the video stream. The output signals of circuit 20 are managed, for example, by sample and hold followed by multiplexing in a way that is known in itself from the prior art.

The layout and operation of the components described above is conventional and is not explained in any greater detail for the sake of brevity.

Data on the output of readout circuit 20 constitutes the "raw" data, i.e. data prior to any analogue or digital processing intended to correct defects in the bolometers. A pixel in an image in the video stream provided by circuit 20 therefore corresponds to the raw value obtained from a bolometer.

A high-speed computing circuit 60 such as a Digital Signal Processor (DSP) is connected to the output of readout circuit 20 and applies an offset and gain correction to each image in this stream in order to correct the offset dispersion and gain dispersion of the bolometers in array 10. This correction is conventionally referred to as "two-point" correction and is preferably implemented in accordance with the equation:

$$S_{cor}(i,j) = G(i,j) \times S_{brut}(i,j) + O(i,j) \quad (1)$$

where:

$S_{brut}(i,j)$ is the raw value of a pixel having the coordinates (i, j) in an image in the video stream output by circuit 20;

$S_{cor}(i,j)$ is the value of pixel (i, j) corrected for offset dispersion and gain dispersion;

$O(i,j)$ is an offset correction factor for pixel (i, j), stored in an offset table 81 in a memory unit 80 associated with high-speed DSP 60; and $G(i,j)$ is a gain correction factor for pixel (i, j), stored in a gain table 82 in a memory unit 80.

Memory unit 80 is also capable of storing a predetermined number $M+1$ of specific raw value tables referred to below as "shutter" tables 83, $84_1$, $84_2$, $84_3$, ..., $84_M$ which correspond to images provided by readout circuit 20 that are formed when shutter 50 is closed. Each of the shutter tables 83, $84_1$, $84_2$, $84_3$, ..., $84_M$ is stored with parameters that characterise its acquisition, in particular the instant at which it was acquired, and the temperature measured by sensor 30 at the time of said acquisition as well as parameters that characterise acquisition quality, as will be explained in detail later on.

A maintenance and computing unit 70 is also provided. This unit, referred to below simply as "unit 70", is connected to shutter 50, readout circuit 20 and memory unit 80. Unit 70 comprises a memory 72 for storing intermediate calculations used in order to obtain the tables in memory 80 and an internal clock 74 for time stamping events that occur when computing various tables, as will be explained in detail later on.

The content of the memory area reserved for the offset and shutter tables of unit 80 is preferably free (indefinite or arbitrary) when the detector leaves the factory. The offset tables 81 and shutter tables 83, $84_1$, $84_2$, $84_3$, ..., $84_N$ (N<=M) are gradually formed in this space (acquired and stored depending on their initial content or, in other words, initialised) and then updated only while the detector is operating without any prior calibration of the detector before it is first used.

For the two-point correction used by high-speed DSP 60 in accordance with equation (1), the gain table 82 is usually factory calibrated. To achieve this, a first and a second output image from readout circuit 60 of a first and a second uniform-temperature black body respectively are acquired; the first black body has a temperature lower than that of the second black body and the array of bolometers 10 is subjected to an identical reference ambient temperature.

The reader is reminded that here the term "ambient temperature" denotes the temperature to which the focal plane of the detector, and hence its retina, are subjected. The ambient temperature differs from the temperature of the bolometers which is impacted by the radiation that is incident on the detection retina and therefore cannot be used as a measure of ambient temperature.

The gain correction factor G(i,j) for pixel (i, j) is then computed according to the equation:

$$G(i, j) = \frac{\overline{S_1(i, j)} - \overline{S_2(i, j)}}{S_1(i, j) - S_2(i, j)} \quad (2)$$

where:
$S_1(i,j)$ is the value of pixel (i, j) in the first image;
$S_2(i,j)$ is the value of pixel (i, j) in the second image;
$\overline{S_1(i,j)}$ and $\overline{S_2(i,j)}$ is the mean value across all table S1 or S2.

Figure 2:
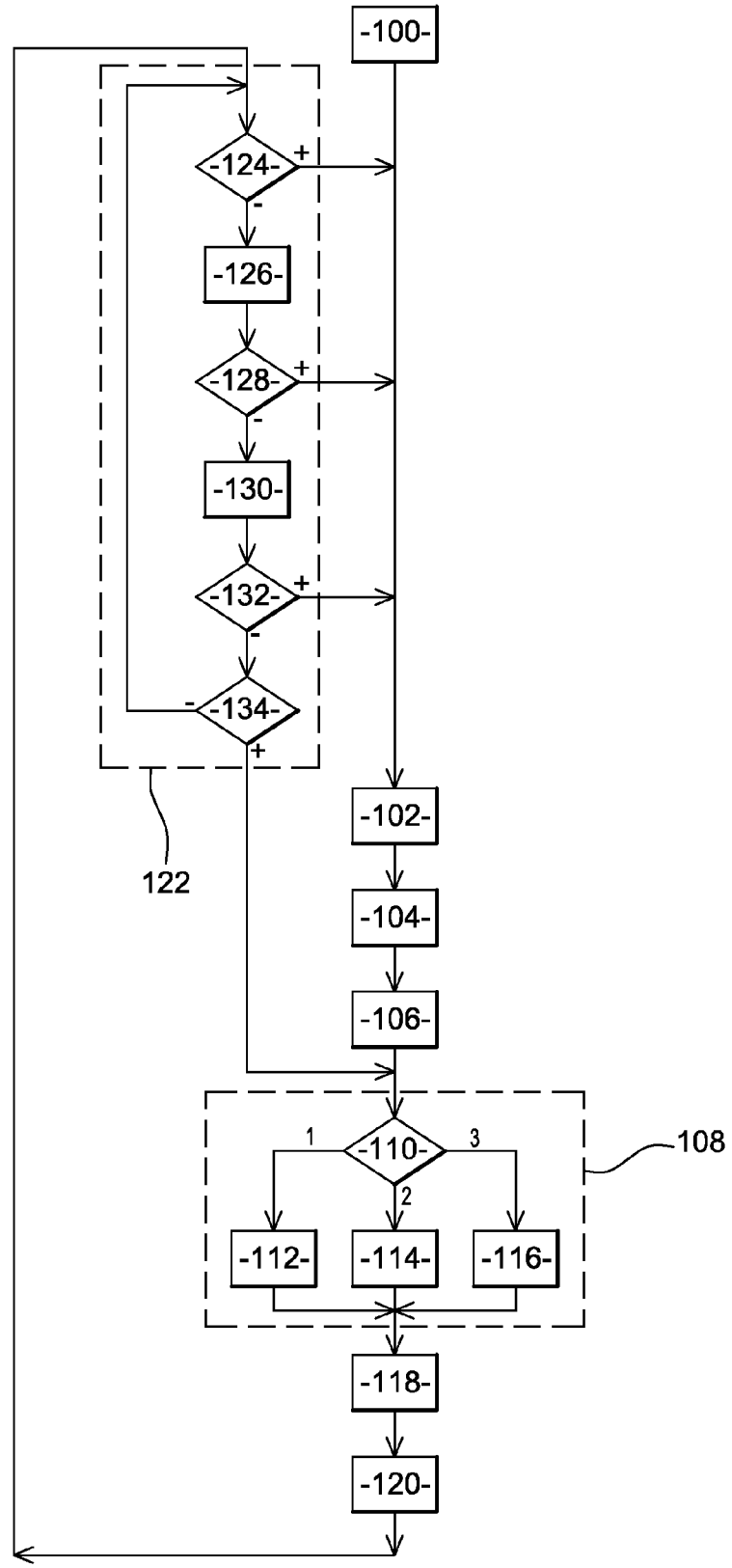
FIGS. 2 and 3 are flowcharts that illustrate one method used by the detector in FIG. 1.
Figure 3:
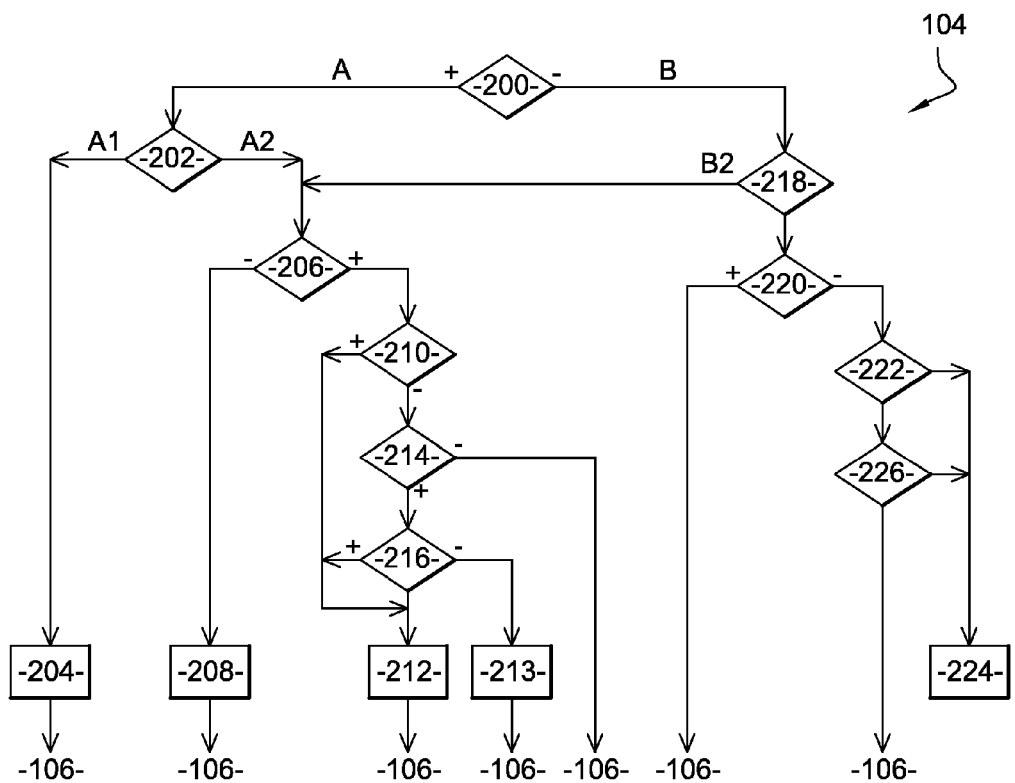

Unit 70 manages the content of shutter tables 83, 84$_1$, 84$_2$, 84$_3$, ..., 84$_N$ and computes offset table 81 as a function of shutter tables 83, 84$_1$, 84$_2$, 84$_3$, ..., 84$_N$ by using a method according to the invention described now, making reference to the flowcharts in FIGS. 2 and 3.

Following switch-on of the detector in step 100, unit 70 controls, in 102, acquisition of a new shutter table by closing shutter 50 and storing an image (a raw value table) from the output stream of readout circuit 20 in memory 72 of unit 70, with the stored table constituting this new shutter table. At the same time as storing said table, temperature $T_{amb}$ of the substrate measured by sensor 30 at the instant when the table is acquired $t_{acqui}$ and that instant are stored in memory 72.

Advantageously, parameters that characterise the quality of acquisition of the new shutter table are also evaluated and stored together with the new shutter table and, more especially, the temperature stability at the time of acquisition. According to the invention, the temperature stability at the time of acquisition is quantified by a stability criterion which is subsequently referred to as the "temperature stability criterion" and explained in greater detail below.

To achieve this, at the same time as the maintenance process, unit 70 periodically samples the temperature signal, typically every second, and uses this time sampling which includes the instant at which the new shutter table was acquired, to estimate a so-called "temperature stability" parameter. Unit 70 stores this stability parameter in memory 72 in the form of a parameter associated with the new shutter table.

The method then continues by replacing, in 104, shutter table 83 with the newly acquired table stored in memory 72 of unit 70. It is thus apparent that shutter table 83 is, out of the tables stored in memory 80, the most recent table and it is designated the current shutter table or the current table.

Step 104 then continues with step 106 during which a series of conditions for updating tables 84$_1$, 84$_2$, 84$_3$, ..., 84$_N$ are evaluated and the tables are updated if one of the conditions is met. More especially, it is determined whether table 83 should be added to existing tables 84$_1$, 84$_2$, 84$_3$, ..., 84$_N$ or whether it should replace one of them, as will be explained in greater detail later on.

The method then continues by updating, in 108, offset table 81. Updating of offset table 81 is advantageously implemented by polynomial interpolation of current table 83 and $\underline{n}$ tables out of the $\underline{N}$ available tables 84$_1$, 84$_2$, 84$_3$, ..., 84$_N$. For example, the invention aims to obtain seven tables (M=7) 84$_1$, 84$_2$, 84$_3$, ..., 84$_7$ but interpolation is performed at an instant when five tables 84$_1$, 84$_2$, ..., 84$_5$ are available, as a function of current table 83 and two tables selected from the series 84$_1$, 84$_2$, 84$_3$, ..., 84$_5$, i.e. interpolation between three shutter tables. It is understood that, after the detector has operated for a sufficient total amount of time, the number of tables N will reach the predetermined number M=7 and two tables will be selected out of seven tables in series 84$_1$, 84$_2$, 84$_3$, ..., 84$_7$ for interpolation.

Unit 70 then reads the "current" temperature measurement (at the instant in question) output by sensor 30 and evaluates, as a function of the latter by interpolating each element in a so-called "interpolated" table which is stored in memory 72 of unit 70.

If the number of shutter tables 84$_1$, 84$_2$, 84$_3$, ..., 84$_N$ is not yet sufficient for polynomial interpolation, as is the case when the detector is first put into operation, for example, if no default table is pre-stored before leaving the factory, the degree of interpolation is adapted to suit the number of tables in memory unit 80.

Thus, if only current table 83 is present in memory unit 80, the interpolated table is set, in 112, as being equal to current table 83 (branch "1" of test step 110 testing the number of tables present in memory unit 80). If two tables (in this case 83 and 84$_1$) are present in memory unit 80, first-order interpolation is used in 114 (branch "2" of test step 110). Otherwise, second-order interpolation is used, in 116, if memory unit 80 contains at least three shutter tables (in this case 83, 84$_1$ and 84$_2$; branch "3" of test step 110).

If memory unit 80 is loaded in the factory, before commissioning, with at least two default tables 84$_1$ and 84$_2$, there is advantageously no longer any need for branches "1" and "2" in test step 110.

The $\underline{n}$ shutter tables selected out of the $\underline{N}$ stored tables are chosen as a function of the acquisition temperature of the tables and/or as a function of their temperature relative to the temperatures of adjacent tables and/or as a function of their temperature stability. Other types of criteria may, however, be used to select the shutter tables that are earmarked for the interpolation calculation.

Note that, since current table 83 is regularly and/or periodically updated, as will be explained later on, it is legitimate to ask whether there is any need for interpolation and therefore, ultimately, any need to acquire and store shutter tables 84$_1$, 84$_2$, 84$_3$, ..., 84$_N$, especially given the fact that interpolation uses large amounts of computing resources. A small variation in ambient temperature (several tenths of a degree for instance) causes a large variation in the raw value of the output signal of circuit 20, hence the usefulness of interpolation, at the "current" ambient temperature, based on the last shutter table 83 acquired; this is a more accurate table intended for computing the offset table. In addition, it is not advantageous to update current table 83 very frequently because the detector is not operational while shutter 50 is closed.

Once interpolation has completed, the method continues, in 118, by computing a new offset table 81 as a function of the interpolated table obtained. Each element (i, j) in offset table 81 is preferably updated in accordance with the equation:

$$O(i,j) = \overline{S_{interp}} - G(i,j) \times S_{int\ erp}(i,j)$$

where:
$S_{int\ erp}(i,j)$ is the value in interpolated table $S_{int\ erp}$ for element (i, j) of the latter; and
$\overline{S_{interp}}$ is the mean of the elements in interpolated table $S_{int\ erp}$.

Values O(i,j) are stored gradually as computing progresses in a temporary table stored in memory 72 of unit 70, this temporary table then replaces, in 120, table 81 when all its elements have been computed. The new offset table 81 is then used to correct the output video stream from readout circuit 20.

Step 120 then continues with a step 122 in which a condition for updating offset table 81 is evaluated. While updating of this table is automatically triggered following switch-on of the detector, the operating conditions of the detector and, in particular, the temperature conditions and operating state of the bolometers may vary while detector is being used.

More particularly, in step 124, a test is performed to decide whether the user requested updating of offset table 81. Such a request can, for example, be made by activating a control specially provided for this purpose on the detector's package or be made via a man-machine interface (MMI) with which the detector is equipped. If such a request is made, step 108 for updating the offset table is then triggered.

The user may also request acquisition of a new shutter table with the aid of another MMI command in step 125. If such a request is made, step 102 for acquiring a new shutter table is then triggered.

Otherwise, clock 74 of unit 70 is read in 126, then the read-out value of the clock is compared, in 128, to the instant at which current table 83 stored together with the latter was acquired. If the time that has elapsed since the last time that current table 83, and hence offset table 81, was updated in the embodiment described exceeds a predetermined duration $\Delta t\_min$, equal to 15 minutes for example, step 102 for acquiring a new shutter table 83 is then triggered.

If this is not the case, the current temperature measured by sensor 30 is then read in 130, then the measured temperature is compared, in 132, to the acquisition temperature of current table 83 stored together with the latter. If the absolute value of the difference between these two temperatures exceeds a first predetermined threshold $\Delta Tamb\_shut\_min$, equal to 1° C. for example, step 102 for acquiring a new shutter table 83 is then triggered.

Otherwise, the absolute value of the difference between the two temperatures is compared, in 134, to a second predetermined threshold $\Delta Tamb\_int\_min$ which is less than first threshold $\Delta Tamb\_shut\_min$ and equal to several tenths of a degree, e.g. 0.2° C. If the difference is less than second threshold $\Delta Tamb\_shut\_min$, the method then branches to step 124 in order to re-evaluate the condition for updating offset table 81.

In contrast, if the difference exceeds second threshold $\Delta Tamb\_shut\_min$, the method branches to interpolation step 108 in order to compute a new interpolation table (and therefore, subsequently, a new offset table 83) for the current temperature measured by sensor 30 which is different to that in current table 83 and therefore the temperature at which the currently stored offset table 81 was computed.

Thus, it is apparent that offset table 81 is updated when its validity is compromised, for example because it is too old or there has been a significant temperature variation.

The maintenance condition for shutter tables $84_1$, $84_2$, $84_3$, ..., $84_N$ and the way in which they are maintained as implemented in step 104 will now be described, making reference to the flowchart in FIG. 3 and the graph in FIG. 4.

Figure 4:
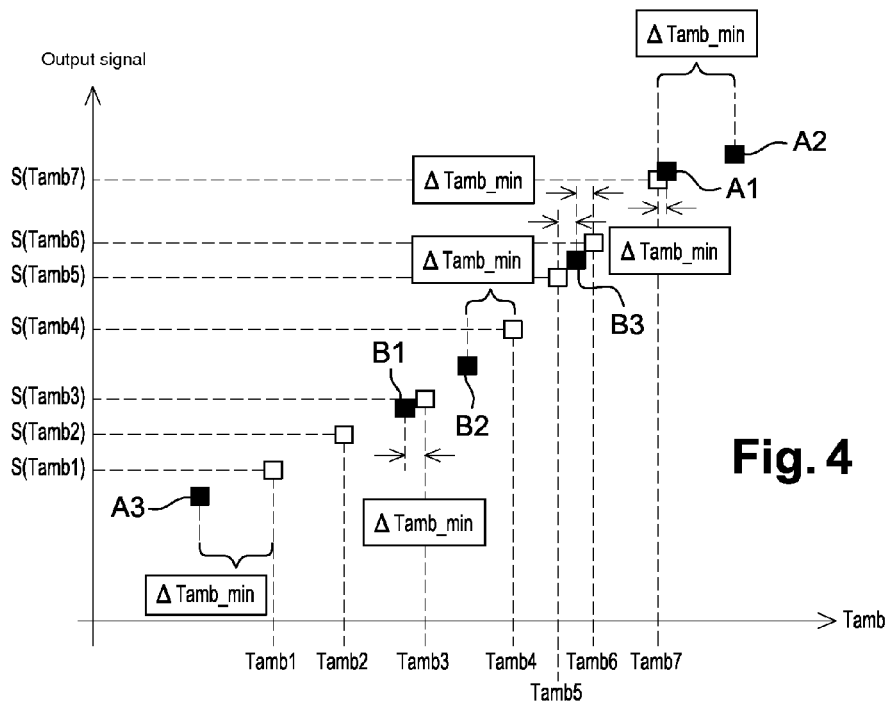
FIG. 4 illustrates temperature criteria that are used when updating the tables used to compute the offset correction values in accordance with the invention.

FIG. 4 illustrates, more particularly, the various temperature criteria used for the maintenance of tables $84_1$, $84_2$, $84_3$, ..., $84_N$. For the sake of simplicity and without making the invention harder to understand, the shutter tables of the set stored here are represented on the y-axis by a scalar (which represents the arbitrary raw value of any bolometer) and the x-axis represents their associated acquisition temperature. Finally, the white squares denote tables $84_1$, $84_2$, $84_3$, ..., $84_N$ and the black squares denote different instances of current tables 83.

Finally, this figure illustrates a case in which there are at least two acquired shutter tables $84_1$, $84_2$, $84_3$, ..., $84_N$. As stated earlier, it is advantageous if, when the detector is initially put into service, there are two factory pre-stored default tables $84_1$ and $84_2$.

If there is only one stored table $84_1$, a shutter acquisition is triggered in 102 and the newly acquired table is stored as the current table 83 in step 106. Then, test 200 in step 104 causes branching "A" to step 104 which is detailed later on in the general case.

When the detector is switched on for the first time, no shutter table is stored in memory 80. Initial acquisition is triggered in 102 and the newly acquired table is stored as the current table 83 in step 106. When the shutter tables are updated in 104, table 83 is then stored (copied) as the first shutter table $84_1$.

Step 104 starts, in 200, by testing whether the acquisition temperature of current table 83 falls within the temperature range defined by the lowest temperature and the highest temperature associated with shutter tables $84_1$, $84_2$, $84_3$, ..., $84_N$.

If the acquisition temperature does not fall within said range (branch "A" of test 200), a new test is performed, in 202, to decide whether the absolute value of the difference between the acquisition temperature of current table 83 and the closest acquisition temperature among the temperatures of tables $84_1$, $84_2$, $84_3$, ..., $84_N$ is less than a first temperature threshold $\Delta Tamb\_min$.

If it is (branch "A1" of test 202), current table 83 is substituted (is copied to) the shutter table having the closest temperature. Temperature threshold $\Delta Tamb\_min$ is always lower than threshold $\Delta Tamb\_shut\_min$ and is preferably selected as roughly 0.9° C. for a value of $\Delta Tamb\_shut\_min$ equal to 1° C.

Alternatively, this threshold may be variable as a function, in particular, of the detector's operating temperature range, the nominal number M of shutter tables $84_1$, $84_2$, $84_3$, ..., $84_M$ with which the detector is expected to operate and the threshold $\Delta Tamb\_shut\_min$ for the temperature difference between two operations to acquire the current table.

If the difference in the absolute value of the temperature of table 83 and the closest of tables $84_1$, $84_2$, $84_3$, ..., $84_N$ exceeds threshold $\Delta Tamb\_min$ (branch "A2" of test 202), a test is performed, in 206, to ascertain whether the number of tables $84_1$, $84_2$, $84_3$, ..., $84_N$ acquired up to the present instant equals the target number M of shutter tables. If this is not the case, current table 83 is then added, in 208, to tables $84_1$, $84_2$, $84_3$, ..., $84_N$ that have already been acquired.

If M shutter tables $84_1$, $84_2$, $84_3$, ..., $84_N$ have already been acquired (N=M), the method continues by evaluating a condition for replacing one of them by copying current table 83.

More particularly, the shutter table to be replaced will be selected according to its degree of obsolescence. Said degree of obsolescence of the shutter table will, for example, be estimated in the form of the number of times the detector has been switched on since said table was acquired. This number is updated by incrementing it each time the detector is restarted. A test is performed in 210 to ascertain whether a shutter table $84_1$, $84_2$, $84_3$, ..., $84_N$ is associated with a number of start-ups in excess of a predetermined threshold.

The shutter table thus selected is replaced, in 212, with current table 83. This way one ensures that shutter tables $84_1$, $84_2$, $84_3$, ..., $84_N$ are sufficiently recent to be deemed relevant for computing offset table 81. It is known that the characteristics of bolometers, especially their offset, are affected by very slow drift over time. Offsets therefore vary over time even for the same temperature and it is therefore advantageous to give preference to recent shutter tables as a basis for computing offsets.

If all shutter tables $84_1, 84_2, 84_3, \ldots, 84_N$ are considered to be sufficiently recent, a test is then performed in 214 to ascertain whether the temperature stability criterion of current table 83 exceeds the smallest of the stability criteria of shutter tables $84_1, 84_2, 84_3, \ldots, 84_N$, thereby recognising the fact that the conditions under which table 83 was acquired were better than those under which the shutter table having the smallest criterion was acquired and that current table 83 is therefore more relevant than the latter.

An example of a temperature stability criterion will now be described in relation to FIG. 5.

As previously described, ambient temperature Tamb is acquired periodically, e.g. every second, by sensor 30, independently and at the same time as new shutter tables are acquired and the offset table is updated. Time derivative $$\frac{dTamb}{dt}$$

(FIG. 5) and the values Sb and S described below are also computed subsequent to acquisition of temperature Tamb by sensor 30 and are stored in memory 72.

If the time derivative of temperature $$\frac{dTamb}{dt}$$

falls within a predetermined range $[-\Delta S; +\Delta S]$, a variable Sb is set to a predetermined positive value $\alpha$, otherwise it is set to a predetermined negative value $\beta$ (FIG. 6). Variable Sb is then time integrated and bounded between 0 and 100; changes in integral S of variable Sb are shown in FIG. 7. Value "0" of integral S indicates temperature stability at the time of acquisition was particularly poor whereas value "100" of integral S indicates particularly good stability. Preferably, value $\beta$ exceeds the absolute value of value $\alpha$. Thus, integral S decreases faster than it increases in order to give more weight to values of derivative $$\frac{dTamb}{dt}$$

that do not lie within the range $[-\Delta S; +\Delta S]$. For example, variable S takes 10 minutes to reach upper limit 100 starting from 0 but takes 3 minutes to reach lower limit 0 starting from 100.

The value of the temperature stability criterion of the acquired shutter table is then, for example, given by the value of variable S at acquisition instant t_acqui, which is 80 in the example in FIG. 7.

Referring to FIG. 3 once again, in step 214 a decision is made as to whether the stability criterion of current table 83 exceeds the smallest of the stability criteria of all the stored shutter tables $84_1, 84_2, 84_3, \ldots, 84_N$.

If it does not, current table 83 is not durably stored in a shutter table $84_1, 84_2, 84_3, \ldots, 84_N$. Table 83 is only used to compute subsequent interpolation prior to the next acquisition, in 102, of a shutter table that will replace it in 104.

If this is the case, current table 83 replaces one of shutter tables $84_1, 84_2, 84_3, \ldots, 84_N$ by copying. In order to select the shutter table to be replaced, another test is performed in 216 to ascertain whether there is a single table with a stability criteria that is equal to or less than the stability criterion of current table 83. If there is, this single shutter table is replaced in 212 with current table 83. If there is not, i.e. there are several shutter tables that have a stability criterion equal to or less than current table 83, the shutter table that has the oldest acquisition instant of these tables is replaced in 213 with current table 83.

The time order in which shutter tables $84_1, 84_2, 84_3, \ldots, 84_N$ are acquired is identified, for example, by a number that is incremented for all the tables when one of the tables is added or replaced. The highest number then corresponds to the table that was acquired the furthest back in time.

If the acquisition temperature of current table 83 falls within the temperature range defined by the lowest temperature and the highest temperature associated with shutter tables $84_1, 84_2, 84_3, \ldots, 84_N$ (branch "B" of test 200), a test is performed, in 218, to ascertain whether the acquisition temperature of current table 83 differs, in terms of absolute value, from all the temperatures of shutter tables $84_1, 84_2, 84_3, \ldots, 84_N$ by at least threshold $\Delta$Tamb_min. If it does (branch "B2" of test 218), the method loops to test step 206 in order to ascertain whether to add or replace a table.

If it does not (branch "B1" of test 218), i.e. there is at least one shutter table $84_1, 84_2, 84_3, \ldots, 84_N$ having a temperature that is less than $\Delta$Tamb_min close to table 83, a test is then performed, in 220, to ascertain whether the number of shutter tables $84_1, 84_2, 84_3, \ldots, 84_N$ that are less than $\Delta$Tamb_min close in temperature to common table 83 is equal or greater than two. If there are, shutter tables $84_1, 84_2, 84_3, \ldots, 84_N$ are not replaced with current table 83.

If there are not, i.e. only one of shutter tables $84_1, 84_2, 84_3, \ldots, 84_N$ is less than $\Delta$Tamb_min close in temperature to current table 83, a test similar to test 210 on age is performed in 222 in order to replace, in 224, the oldest table in the same way as described above.

If the age criterion is not adopted, a test similar to that used in test 214 is performed in 226. Replacement, in 224, of the shutter table based on the temperature stability criterion is then performed in the same way as described above.

Experiments have been conducted in order to establish the validity of the invention.

In particular, a detector according to the invention was placed in front of a black body having a uniform temperature of 40° C., exposing its focal plane to the temperature profile shown in FIG. 8 after installing it inside an environmental chamber. As is apparent, the temperature of the focal plane varies from −15° C. to +60° C. in successive level temperature stages with gradients between successive stages being of the order ±1.5° C./min.

The offset table was updated every 15 minutes and/or each time a temperature variation of 1° C. was measured, the shutter tables and the offset table were updated in the way described above: closure of shutter, acquisition of new current table, maintenance of shutter tables, etc.

The criteria adopted in order to qualify the effectiveness of the method according to the invention is the residual fixed spatial noise (BSFR) to temporal noise (BRMS) ratio. FIG. 9 illustrates this ratio during the thermal cycling in FIG. 8, according to the prior art using factory-calibrated offset tables and according to the invention. It is apparent that the BSFR to BRMS ratio according to the invention is substantially equal to the BSFR to BRMS ratio according to the prior art and varies from 1 to 2; this represents a very satisfactory result and demonstrates the effectiveness of the correction method according to the invention.

An embodiment that uses "two-point" correction is described above. Alternatively, "single-point" correction is used and only corrects the offset dispersion. In this case, gain table 82 is omitted.

Similarly, several temperatures can be acquired at different points of the detector (e.g. one measurement at one point on the substrate, one measurement at a point on the package that contains the retina and substrate, etc.) in order to better capture transient temperature phenomena. In such a case, interpolation of the tables is multidimensional.

Similarly, a preferred order of priority for shutter table maintenance criteria is described above (temperature difference, obsolescence, stability, relative age). Obviously, a different order of priority can be chosen.

Similarly, other criteria can be used.

The invention has the following advantages:
operation of the detector without temperature control over a wide temperature range;
very simple, quick factory calibration because calibration does not involve placing the detector in a thermostatted enclosure with stabilisation for long periods by holding different target ambient temperatures Tamb. Consequently, the time needed to calibrate the detector is significantly reduced compared with detectors according to the prior art that use pre-calibrated offset tables. In the case of "two-point" correction in particular, calibration is reduced to calibrating a single gain table. This also results in lower equipment and operating costs and therefore reduces the cost of manufacturing such detectors considerably;
interpolating the shutter tables at different temperatures and recurrent maintenance of these tables make it possible, in particular, to:
obtain good quality images at a shutter closing frequency that is reduced to the minimum required, i.e. for a low image loss frequency;
manage transitions in the temperature of the retina by retaining images that exhibit relatively little spatial variation during these transitions;
produce corrected images having a quality that is not dependent on spatial drift (i.e. from one bolometer to another) or overall time drift of the array of bolometers obtained by classic offset calibration as well as drift associated with electronic control circuitry;
use a single gain correction table for all temperatures, this simplifies and speeds up calculations;
the readout circuit used by the detector according to the invention is relatively simple and devoid of any particular complication that is likely to adversely affect fabrication yields. Also, the capacity of the memories required in order to implement the invention is limited to the bare minimum necessary and this reduces the cost and complexity of the entire system.

What is claimed is:

1. A method for correcting images produced by an array of bolometers of a detector without temperature regulation, said array including a retina of bolometric membranes arranged in the focal plane of optics and suspended above a substrate in which there is formed a readout circuit that outputs a stream of raw signal values that correspond to each bolometer in the array in relation to an observed scene, with the detector also including a shutter arranged between the optics and the retina, the method comprising, in an operating mode in which the ambient temperature conditions of the detector are free to change:
a first step of closing the shutter and acquiring and storing in a memory of the detector:
a current table of raw values corresponding to an image of the shutter by the array of bolometers; and
a temperature of the detector during acquisition of said current raw value table,
a second step of determining and storing, in the memory of the detector, an offset correction table for the current temperature of the detector as a function of:
the current raw value table and the temperature associated thereof; and
a current set of raw value tables corresponding to images of the shutter by the array of bolometers previously stored in the detector's memory and temperatures of the detector associated respectively with each of these tables at the time they were acquired, said temperatures being stored in the detector's memory; and
a third step of correcting the stream of raw values using the offset correction table,
wherein the method further comprises, subsequent to the acquisition of a current raw value table, a maintenance process for maintaining of the current set of raw value tables, including:
testing a condition for replacing a table of said current set with the current raw value table; and
if said condition is met, replacing the table of said current set of tables with the current raw value table and replacing the acquisition temperature of the replaced table with the acquisition temperature of the current raw value table,
said test including the determination, on the basis of at least one predetermined criterion, of whether there is a new set of tables obtained by replacing a table from the current set with the current table that is more relevant than the current set to subsequent determination of the offset table.

2. The method of claim 1, wherein the current set of stored tables is partially or totally built as a function of current tables acquired while the detector is operating.

3. The method of claim 1, wherein the at least one criterion comprises a criterion relating to the relevance of the tables to the detector's current operating state.

4. The method of claim 3, wherein the at least one criterion comprises a criterion relating to the age of the acquisition of the tables.

5. The method of claim 3, wherein the at least one criterion comprises a criterion relating to the detector's temperature stability at the time said raw value tables were acquired.

6. The method of claim 1, wherein the at least one criterion comprises a criterion relating to the relevance of the tables to computing the offset correction table.

7. The method of claim 6, wherein the at least one criterion comprises a criterion relating to the distribution of the temperatures at which the tables were acquired with updating the set of raw value tables ensuring optimal distribution of these temperatures within the temperature range over which the detector operates.

8. The method of claim 1, further comprising evaluating a first condition for updating the offset correction table which, if said first condition is met, triggers:
closure of the shutter, acquisition of a current raw value table and maintenance of the process of the current set of stored tables; and computation of a new offset correction table as a function of the current raw value table and the set of stored raw value tables.

9. The method of claim 8, wherein the first condition for updating the offset correction table comprises a criterion relating to the age of the current raw value table, said first condition being met, in particular, if the age of the current table exceeds a predetermined duration.

10. The method of claim 8, wherein the first condition for updating the offset correction table comprises a criterion relating to the difference between the detector's current temperature and the temperature of the detector associated with the current raw value table, said first condition being met if said difference exceeds a first predetermined threshold.

11. The method of claim 8, further comprising evaluating a second condition for updating the offset correction table, which if said second updating condition is met, triggers computing a new offset correction table as a function of the current raw value table and the set of stored raw value tables without triggering the maintenance process.

12. The method of claim 11, wherein the second condition for updating the offset correction table comprises a criterion relating to the difference between the detector's current temperature and the temperature of the detector associated with the last time the offset correction table was computed, said second condition being met if said difference exceeds a second predetermined threshold that is lower than the first threshold.

13. The method of claim 8, wherein a set correction table involves computing an interpolated raw value table by interpolating the current raw value table and a predetermined number of tables of the set of stored raw value tables and in that computing the offset correction table is performed in accordance with the equation:

$$O_n = \overline{S_{interp}(Tamb)} - G_n \times S_{interp}(Tamb)_n$$

where $O_n$ is a value in the offset correction table, $\overline{S_{interp}(Tamb)}$ is the mean value of the interpolated raw value table, $G_n$ is a predetermined correction factor to correct the gain of the bolometer corresponding to said value $O_n$, and $S_{interp}(Tamb)_n$ is the raw value that corresponds to said value $0_n$ of the interpolated table.

14. A thermal detector without temperature regulation comprising:
- an array of bolometers including a retina of bolometric membranes suspended above a substrate in which there is formed a readout circuit that outputs a stream of raw signal values that correspond to each bolometer in the array in relation to an observed scene and arranged in the focal plane of an optics;
- at least one temperature sensor that measures the temperature at one point on the substrate;
- a controllable shutter that forms a uniform scene for the retina; and
- at least one processor and memory for implementing a method in accordance with claim 1.

* * * * *